3,061,445
EFFERVESCENT SWEETENING TABLET
Edward S. Stanish, Highland Park, Ill., assignor to Abbott Laboratories, Chicago, Ill., a corporation of Illinois
No Drawing. Filed Apr. 30, 1959, Ser. No. 809,904
9 Claims. (Cl. 99—141)

This invention relates to a tablet acidulant and, more particularly, to a composition in tablet form containing cyclohexylsulfamic acid.

In the formulation of tablets in the pharmaceutical industry, it is common practice to employ an acidulant in order to speed disintegration of the tablet and, thereby, accelerate absorption of the drug by the body. The acid used for such an acidulant is, in most instances, citric acid. This acid in combination with sodium or calcium carbonate and water results in effervescence and simultaneous disintegration of the tablet. In using citric acid, many obstacles are encountered; namely, it imparts a tart taste to a tablet; it is a weak acid; and relatively large amounts are needed; further, when dissolved in water, it may render the solution cloudy; and finally, citric acid is caloric.

The disadvantages above mentioned are even more patent when citric acid is used as an acidulant in a tablet designed for use as a sweetening agent. Calcium and sodium cyclohexylsulfamates (Sucaryl® calcium and sodium, Abbott) are such sweeteners and, in order to make the tablet more effective as a sweetener, it is expedient to find an acid which will not detract from the sweetening power of calcium or sodium Sucaryl®.

It is, therefore, an object of this invention to provide a composition which will overcome the above described disadvantages and limitations of citric acid as an acidulant.

Another object of the invention is to provide a combination of cyclohexylsulfamic acid and calcium or sodium Sucaryl® in which the tart taste of a tablet using citric acid as an acidulant is avoided.

A further object of the invention is to provide a sweetening tablet with an acidulant which is non-caloric.

Still another object of this invention is to provide an acidulant for a sweetening tablet which has a high ionization rate and a still further object of the invention is to provide a sweetening tablet with an acidulant which will render clear and uncloudy the sweetened solution into which it is placed.

These and other objects and advantages of the invention will be apparent from a consideration of the following detailed description and examples.

It has been found that cyclohexylsulfamic acid (which is sold under the trademark Hexamic Acid®, Abbott, and also known as Sucaryl® acid) is a strong acid and ionizes readily. It can be placed in the class of the strong mineral acids and therefore only small amounts of it need be used where acidulation is required.

Cyclohexylsulfamic acid has a sweet taste unlike any other acids, whether weak or strong, and has an advantageous use as an acidulant in a sweetening tablet. The use of any other acid would impart to a tablet a tart taste which would ultimately have to be overcome or avoided by a sweetener. In using cyclohexylsulfamic acid, however, the initial tartness of an ordinary acid is not present and, therefore, does not have to be avoided.

In addition to this advantage, cyclohexylsulfamic acid also has its own sweetening power and, therefore, complements the sweetening power of calcium or sodium Sucaryl®. Cyclohexylsulfamic acid because of its own sweetening power can be used alone in the absence of any sweetening agent in a tablet and simultaneously provide a sweetness and acidulate.

When cyclohexylsulfamic acid is dissolved in a clear solution, the solution remains crystal clear and no cloudiness occurs. The same can not be said of the various acidulants which are used in artificial sweeteners.

In addition to all these advantages of cyclohexylsulfamic acid as an acidulant, there is the added feature that cyclohexylsulfamic acid is non-caloric. Calcium and sodium Sucaryl® are non-caloric sweetening agents and in order to effectuate their non-caloric factor to the greatest degree it is expedient that the ingredients which compose the tablet contain a minimum number of calories. By combining cyclohexylsulfamic acid with calcium or sodium Sucaryl® the above objective is achieved and a product with the lowest amount of calories conceivable is made marketable for that class of people who, for various reasons, must restrict their caloric intake.

The following examples are given in order to define the invention more precisely, but it is to be understood that the examples are not intended to limit the invention in any way.

*Example I*

Two hundred and forty-eight tablets were prepared according to the following directions.

| Ingredients: | Amount, gms. |
| --- | --- |
| Cyclohexylsulfamic acid | 28 |
| Calcium carbonate | 7.9 |

The calcium carbonate is dried at 60° C. overnight. The cyclohexylsulfamic acid is massed with distilled water and passed through a #16 screen. This solution is then dried at 105° F. to a moisture content of less than 1%. The dry granulation is then passed through a #16-mesh screen and the dried calcium carbonate is then added through a #40-mesh screen. The granulation thus prepared is mixed and compressed so that each tablet equals 2.22 grains. When these tablets are placed in an aqueous medium, an effervescent reaction occurs releasing the cyclohexylsulfamate ion, which is the active sweetener.

*Example II*

Two hundred and forty-eight tablets were prepared according to the following directions.

| Ingredients: | Amount, gms. |
| --- | --- |
| Calcium cyclohexylsulfamate | 15.5 |
| Cyclohexylsulfamic acid | 14 |
| Calcium carbonate | 3.95 |

The ingredients are handled by the procedure indicated in Example I.

*Example III*

Twelve thousand tablets were prepared according to the following directions.

| Ingredients: | Amount, lbs. |
| --- | --- |
| Cyclohexylsulfamic acid | 3 |
| Acacia (1%) | .015 |
| Calcium carbonate (dried) | .644 |

The calcium carbonate is dried overnight at 120° F. The acacia and water are massed together and then spread upon drying trays and dried overnight at 120° F. The cyclohexylsulfamic acid is then added and the composite granulation passed through a #24-mesh screen. The granulation thus prepared is compressed on a 9/32-inch convex punch. Ten of the tablets thus prepared weighed 21.25 grains and each had a thickness of 0.125 inch.

*Example IV*

Tablets were made up to contain the following ingredients.

| Ingredients: | Amount, mg. |
| --- | --- |
| Sodium cyclohexylsulfamate | 101.2 |
| Saccharin soluble | 12.0 |
| Soda ash | 18.0 |
| Sodium bicarbonate | 7.0 |

| Ingredients: | Amount, mg. |
|---|---|
| Acacia | 3.0 |
| Water | 15.0 |
| Cyclohexylsulfamic acid | 32.34 |
| Sodium citrate | 3.9 |
| Sodium benzoate | 4.0 |
| Saccharin insoluble | 0.5 |
| Soda ash | 1.0 |

Make a solution of acacia and water and add the first four powders. Pass through a #14-mesh screen and dry. Blend with the last five ingredients and compress into tablets. A tablet weighs about 180 mg. and is equivalent in sweetness to about 2 or 2½ teaspoonfuls of sugar. The tablet does not give an off-taste to saccharin sensitive people and is effervescent in order to speed distintegration.

*Example V*

Tablets were prepared according to the following directions.

| Ingredients: | Amount, lbs. |
|---|---|
| Cyclohexylsulfamic acid | 483.55 |
| Saccharin calcium | 34.72 |
| Potassium carbonate | 344.05 |
| Polyethylene glycol (M.W. 6000) | 34.72 |

Charge the cyclohexylsulfamic acid through a Fitzmill at a medium speed and a #16-mesh screen. Charge the saccharin calcium and the cyclohexylsulfamic acid into a Dole mixer and add sufficient distilled water to mass. Granulate through the 5/8 inch band on a Colton rotary granulator and dry the granulation at 140–145° F. in a hot air drier. Meanwhile, charge the potassium carbonate through a Fitzmill #40-mesh screen at high speed and dry at 140—145° F. in a hot air drier. Chill the polyethylene glycol by mixing with Dry Ice and mill the mixture through a #60-mesh screen on the Fitzmill at high speed. Spread thin on the trays to sublime the Dry Ice.

Regranulate the dry mixture of sweetening powders through a #16-mesh screen and add the dried potassium carbonate and the cold polyethylene glycol. Compress into tablets using a 9/32 inch convex punch.

*Example VI*

One thousand tablets were prepared according to the following directions.

| Ingredients: | Amount |
|---|---|
| Cyclohexylsulfamic acid _____gm__ | 44.46 |
| Saccharin sodium _____gm__ | 5.00 |
| Acacia powder _____gm__ | 2.20 |
| Sodium bicarbonate _____gm__ | 21.06 |
| Sodium benzoate _____gm__ | 8.08 |
| Distilled water _____cc__ | 3.60 |
| Carbowax 6000 _____gm__ | .42 |

The cyclohexylsulfamic acid, saccharin sodium and acacia are mixed together and screened through a #30-mesh screen. The distilled water is added to this mixture slowly and the mixture kneaded well. The wet mass is then screened through a #6-mesh screen and dried at 50° C. for 24 hours. The dried granulation is subsequently screened through a #30-mesh screen. The sodium bicarbonate and sodium benzoate are passed through a #60-mesh screen and all of the ingredients are mixed together by tumbling. The tablets are compressed on a ¼ inch convex punch and the compression weight for 10 tablets is .808 gms. The distintegration time of the tablets prepared by this example is 30 to 40 seconds in cold water and considerably lower in hot water and hot beverages.

*Example VII*

One thousand tablets were prepared according to the following directions.

| Ingredients: | Amount |
|---|---|
| Sodium cyclohexylsulfamate _____gms__ | 37.50 |
| Cyclohexylsulfamic acid _____gms__ | 11.18 |
| Acacia _____gms__ | 2.40 |
| Saccharin sodium _____gms__ | 6.00 |
| Sodium bicarbonate _____gms__ | 5.25 |
| Carbowax 6000 _____gms__ | 2.40 |
| Sodium benzoate _____percent__ | 1 |
| Distilled water _____cc__ | 15 |

The same procedure is followed as outlined in Exmaple VI. The tables also having the same disintegration time.

*Example VIII*

One thousands tablets were prepared according to the following directions.

| Ingredients: | Amount |
|---|---|
| Sodium cyclohexylsulfamate _____gm__ | 24.70 |
| Cyclohexylsulfamic acid _____gm__ | 22.20 |
| Saccharin sodium _____gm__ | 6.00 |
| Acacia _____gm__ | 2.70 |
| Sodium bicarbonate _____gm__ | 10.40 |
| Carbowax 6000 milled _____gm__ | 2.70 |
| Distilled water _____cc__ | 10 |

Mix the sodium cyclohexylsulfamate, the cyclohexylsulfamic acid, the saccharin sodium and the acacia together and screen through a #30-mesh screen. Add the distilled water slowly to this mixture and knead well. Screen the wet mass through a #6-mesh screen and dry at 50° C. for 24 hours. Screen the dried granulation through a #30-mesh screen. Pass the sodium bicarbonate and carbowax through a #40-mesh screen. Mix all ingredients together by tumbling and compress tablets using a 13/64 convex punch with a compressing weight of 10 tablets equal 687 gms. The distintegration time of the tablets is 30 to 40 seconds.

Others may practice the invention in any of the numerous ways which will be suggested by this disclosure to one skilled in the art. All such practice of the invention is considered to be a part thereof provided it falls within the scope of the appended claims.

I claim:

1. An effervescent tablet characterized by sweetness and its ability to disintegrate in an aqueous medium comprising cyclohexylsulfamic acid and a substance capable of releasing carbon dioxide upon contact with an aqueous, acidic medium said substance selected from the group consisting of carbonate and bicarbonate salts.

2. An effervescent tablet characterized by sweetness and its ability to disintegrate in an aqueous medium comprising cyclohexylsulfamic acid, a substance capable of releasing carbon dioxide upon contact with an aqueous, acidic medium said substance selected from the group consisting of carbonate and bicarbonate salts and a physiologically acceptable salt of cyclamate.

3. An effervescent tablet characterized by sweetness and its ability to disintegrate in an aqueous medium comprising the dry combination of saccharin, cyclohexylsulfamic acid and a substance capable of releasing carbon dioxide upon contact with an aqueous, acidic medium said substance selected from the group consisting of carbonate and bicarbonate salts.

4. An effervescent tablet characterized by sweetness and its ability to disintegrate in an aqueous medium comprising the dry combination of saccharin, cyclohexylsulfamic acid, a substance capable of releasing carbon dioxide upon contact with an aqueous, acidic medium said substance selected from the group consisting of carbonate and bicarbonate salts and a physiologically acceptable salt of cyclamate.

5. An effervescent tablet characterized by sweetness and its ability to disintegrate in an aqueous medium comprising the dry combination of saccharin, cyclohexylsulfamic acid and potassium carbonate with at least about two molecular proportions of cyclohexyl sulfamic acid per one molecular proportion of potassium carbonate.

6. An effervescent tablet characterized by sweetness and its ability to disintegrate in an aqueous medium comprising the dry combination of cyclohexylsulfamic acid, calcium carbonate and a physiologically acceptable salt of cyclamate with at least about two molecular proportions of cyclohexylsulfamic acid per one molecular proportion of calcium carbonate.

7. An effervescent tablet characetrized by sweetness and its ability to disintegrate in an aqueous medium comprising the dry combination of saccharin, cyclohexylsulfamic acid, sodium bicarbonate and a physiologically acceptable salt of cyclamate with at least about equimolar proportions of cyclohexylsulfamic acid and sodium bicarbonate.

8. An effervescent tablet characterized by sweetness and its ability to disintegrate in an aqueous medium comprising the dry combination of saccharin, cyclohexylsulfamic acid, sodium bicarbonate and sodium cyclohexylsulfamic acid with at least about equimolar proportions of cyclohexylsulfamic acid and sodium bicarbonate.

9. An effervescent tablet characterized by sweetness and its ability to disintegrate in an aqueous medium comprising the dry combination of saccharin, cyclohexylsulfamic acid, sodium bicarbonate and calcium cyclohexylsulfamic acid with at least about equimolar proportions of cyclohexylsulfamic acid and sodium bicarbonate.

References Cited in the file of this patent

UNITED STATES PATENTS

| | | |
|---|---|---|
| 2,275,125 | Audrieth et al. | Mar. 3, 1942 |
| 2,784,100 | Endicott | Mar. 5, 1957 |
| 2,985,562 | Millard et al. | May 23, 1961 |

OTHER REFERENCES

Pharmaceutical Formulas, vol. I, 11th ed., 1944, published at the offices of The Chemist and Druggist, 28 Essex Street, Strand, London, page 333 (Liq. Glusidi).

"Artificial Sweeting of Tablets," by Endicott et al., Drug and Cosmetic Industry, August 1959: 85, 2, pages 176 and 177.

UNITED STATES PATENT OFFICE
CERTIFICATE OF CORRECTION

Patent No. 3,061,445                          October 30, 1962

Edward S. Stanish

It is hereby certified that error appears in the above numbered patent requiring correction and that the said Letters Patent should read as corrected below.

Column 1, lines 27 and 28, strike out "calcium and sodium, Abbott" and insert before "Sucaryl®" -- marketed under the trademark --; lines 31, 37, 67, and column 2, lines 6 and 11, for "Sucaryl®", each occurrence, read -- cyclohexylsulfamate --; column 1, line 52, for "Sucaryl® acid" read -- Sucaryl Acid® --; column 3, lines 26 and 37, for "Fitzmill", each occurrence, read -- Fitzpatrick mill --; column 4, line 11, for "tables" read -- tablets --.

Signed and sealed this 11th day of June 1963.

(SEAL)
Attest:

ERNEST W. SWIDER

Attesting Officer

DAVID L. LADD

Commissioner of Patents